(12) United States Patent
Lacroix et al.

(10) Patent No.: US 7,097,908 B2
(45) Date of Patent: Aug. 29, 2006

(54) POLYAMIDE/POLYURETHANE MULTILAYER STRUCTURES FOR DECORATED ARTICLES

(75) Inventors: Christophe Lacroix, Mareil sur Mauldre (FR); Thibaut Montanari, Bernay (FR)

(73) Assignee: Arkema, Puteaux (FR)

( * ) Notice: Subject to any disclaimer, the term of this patent is extended or adjusted under 35 U.S.C. 154(b) by 0 days.

(21) Appl. No.: 10/967,587

(22) Filed: Oct. 18, 2004

(65) Prior Publication Data

US 2005/0084685 A1 Apr. 21, 2005

Related U.S. Application Data

(60) Provisional application No. 60/540,481, filed on Jan. 30, 2004.

(30) Foreign Application Priority Data

Oct. 20, 2003 (FR) .................... 03 12221

(51) Int. Cl.
*B32B 27/34* (2006.01)
*B32B 27/40* (2006.01)
*B29C 41/22* (2006.01)

(52) U.S. Cl. ................ 428/423.1; 428/423.5; 428/474.4; 428/475.5; 264/241; 525/420

(58) Field of Classification Search ........... 428/423.1, 428/423.5, 474.4, 475.5; 264/241
See application file for complete search history.

(56) References Cited

U.S. PATENT DOCUMENTS

| | | | |
|---|---|---|---|
| 4,423,185 A | 12/1983 | Matsumoto et al. | |
| 5,135,797 A | 8/1992 | Sasaki | |
| 5,217,794 A | 6/1993 | Schrenk | |
| 5,348,804 A * | 9/1994 | Vasselin et al. | 428/423.1 |
| 5,506,310 A | 4/1996 | Vasselin et al. | |
| 5,616,418 A | 4/1997 | Vasselin et al. | |
| 5,630,844 A | 5/1997 | Dogan et al. | |
| 5,932,353 A * | 8/1999 | Huarng et al. | 428/423.5 |
| 5,989,715 A * | 11/1999 | Kiriazis et al. | 428/425.1 |
| 6,127,043 A | 10/2000 | Lange | |
| 2005/0084685 A1* | 4/2005 | Lacroix et al. | 428/423.5 |
| 2005/0228145 A1* | 10/2005 | Lacroix et al. | 525/420 |

FOREIGN PATENT DOCUMENTS

JP 05-301988 * 11/1993

* cited by examiner

*Primary Examiner*—P. Hampton Hightower
(74) *Attorney, Agent, or Firm*—Thomas F. Roland

(57) ABSTRACT

The present invention relates to a multilayer structure comprising a transparent polyamide-based layer and a layer based on a thermoplastic polyurethane (TPU). The invention also relates to a decorated article consisting of an object to which the above structure has been bonded, the polyamide layer being on the outside. According to another embodiment, the polyamide/TPU structures may be bonded to a polyurethane foam or to a polyurethane resin. It is also possible to overmould the polyurethane foam or the polyurethane resin to the polyamide/TPU structure placed in a mould, the polyamide layer being adjacent to the mould wall. The structure obtained is useful, for example for making skis or sports shoes. The invention also relates to these structures. Advantageously, the polyamide layer is semicrystalline. Advantageously, the TPU layer is transparent. Each of the layers may be formed from several layers.

11 Claims, No Drawings

POLYAMIDE/POLYURETHANE MULTILAYER STRUCTURES FOR DECORATED ARTICLES

This application claims benefit, under U.S.C. §119(a) of French National Application Number 03.12221, filed Oct. 20, 2003; and also claims benefit, under U.S.C. §119(e) of U.S. provisional application 60/540,481, filed Jan. 30, 2004.

FIELD OF THE INVENTION

The present invention relates to polyamide/ thermoplastic polyurethane (TPU) multilayer structures for decorated articles. They are in the form of a film or sheet (usually, the term "film" is used up to a thickness of about 0.5 mm and the term "sheet" beyond that). These structures may be bonded, for example by hot pressing, to an article such as a ski, the polyamide layer being on the outside. In this case, the polyamide layer forms the top of the ski. Before the polyamide/TPU structure is bonded, the ski may be decorated beforehand on the top (that is to say on the opposite part from the sole that slides on the ski), thus, after the polyamide/TPU structure has been bonded and if the TPU layer is translucent or transparent, the decoration may be seen. It is also possible to decorate the ski after the polyamide/TPU structure has been bonded, by subliming inks into the polyamide layer. It is also possible to combine these two methods of decoration.

According to another embodiment, the polyamide/TPU structures may be bonded to a polyurethane-foam—the structure obtained is useful, for example, for sports shoes.

According to another embodiment, the polyamide/TPU structures may be bonded to a rigid polyurethane—the structure obtained is useful, for example, for making various objects.

BACKGROUND OF THE INVENTION

U.S. Pat. Nos. 5,616,418 and 5,506,310 disclose a structure consisting in succession of a polyamide layer, a layer made of a polyamide elastomer/grafted polyolefin blend and a layer that may be made of wood from a metal, epoxy or polyurethane. This structure may be a ski, that is to say the epoxy or polyurethane layer is not a thermoplastic layer but is the core of the ski. This part of the ski is not thermoplastic—the epoxy resin is crosslinked even if it is a polyurethane, i.e. a rigid polyurethane.

SUMMARY OF THE INVENTION

The present invention relates to a multilayer structure comprising a transparent polyamide-based layer and a layer based on a thermoplastic polyurethane (TPU).

The invention also relates to a decorated article consisting of an object to which the above structure has been bonded, the polyamide layer being on the outside. The bonding may be carried out by hot pressing or using an adhesive. The decoration may already exist on the object before a structure is bonded; it is also possible to decorate the polyamide layer by sublimation of inks or by combining these two methods of decoration.

According to another embodiment, the polyamide/TPU structures may be bonded to a polyurethane foam or to a polyurethane resin. It is also possible to overmould the polyurethane foam or the polyurethane resin to the polyamide/TPU structure placed in a mould, the polyamide layer being adjacent to the mould wall. The structure obtained is useful, for example for making skis or sports shoes. The invention also relates to these structures. Advantageously, the polyamide layer is semicrystalline. Advantageously, the TPU layer is transparent.

Each of the layers may be formed from several layers.

The structure of the invention has many advantages. The polyamide layer provides:

abrasion resistance;

impact strength, especially cold impact strength;

the possible decoration by sublimation of inks thanks to its high melting point (or glass transition temperature), whereas the TPU and TPU/ABS blends cannot be decorated by sublimation of inks;

complete transparency with semiaromatic or semicycloaliphatic (PAs) and their possible blends with aliphatic polyamides of the PA-11 or PA-12 type;

UV and chemical resistant glossy appearance; and smooth feel.

adhesion to the screen-printing inks, in particular the polyurethane (PU) ink for the decoration, it being possible for these inks to be deposited on lacquers—there is therefore adhesion to the inks and to the lacquers;

adhesion to a PU foam;

overmoulding TPUs;

the TPU layer is such that the adhesion to the PA is very good; and no pretreatment needed.

DETAILED DESCRIPTION OF THE INVENTION

With regard to the polyamide layer, this comprises at least one polyamide chosen from semiaromatic or semicycloaliphatic PAs and aliphatic polyamides.

The aliphatic polyamides may be chosen from PA-11, PA-12, aliphatic polyamides resulting from the condensation of an aliphatic diamine having from 6 to 12 carbon atoms and of an aliphatic diacid having from 9 to 12 carbon atoms, and 11/12 copolyamides having either more than 90% of 11 units or more than 90% of 12 units.

By way of example of aliphatic polyamides resulting from the condensation of an aliphatic diamine having from 6 to 12 carbon atoms and of an aliphatic diacid having from 9–12 carbon atoms, mention may be made of:

PA-6,12 resulting from the condensation of hexamethylenediamine and 1,12-dodecanedioic acid;

PA-9,12 resulting from the condensation of the $C_9$ diamine and 1,12 dodecanedioic acid;

PA-10,10 resulting from the condensation of the $C_{10}$ diamine and 1,10-decanedioic acid; and PA-10,12 resulting from the condensation of the $C_9$ diamine and 1,12-dodecanedioic acid.

As regards the 11/12 copolyamides having either more than 90% of 11 units or more than 90% of 12 units, these result from the condensation of 1-amino-undecanoic acid with laurylactam (or of the $C_{12}$ $\alpha,\omega$-amino acid).

The polyamide layer may also include copolymers having polyamide blocks and polyether blocks, but it is advantageous that this be in a proportion that does not impair the transparency of this layer.

The copolymers having polyamide blocks and polyether blocks result in general from the copolycondensation of polyamide blocks having reactive end groups with polyether blocks having reactive end groups, such as, inter alia:

1) polyamide blocks having diamine chain ends with polyoxyalkylene blocks having dicarboxylic chain ends;

2) polyamide blocks having dicarboxylic chain ends with polyoxyalkylene blocks having diamine chain ends, obtained by cyanoethylation and hydrogenation of aliphatic dihydroxylated α, ω-polyoxyalkylene blocks called polyetherdiols; and 3) polyamide blocks having dicarboxylic chain ends with polyetherdiols, the products obtained being, in this particular case, polyetheresteramides. The copolymers of the invention are advantageously of this type.

The polyamide blocks having dicarboxylic chain ends derive, for example, from the condensation of polyamide precursors in the presence of a dicarboxylic acid chain stopper.

The polyamide blocks having diamine chain ends derive, for example, from the condensation of polyamide precursors in the presence of a diamine chain stopper.

The polymers having polyamide blocks and polyether blocks may also include randomly distributed units. These polymers may be prepared by the simultaneous reaction of the polyether with the polyamide block precursors.

For example, it is possible to react a polyetherdiol, polyamide precursors and a diacid chain stopper. What is obtained is a polymer having essentially polyether blocks and polyamide blocks of very variable length, but also the various reactants, having reacted in a random fashion, which are distributed randomly along the polymer chain.

It is also possible to react a polyetherdiamine, polyamide precursors and a diacid chain stopper. What is obtained is a polymer having essentially polyether blocks and polyamide blocks of very variable length, but also the various reactants, having reacted in a random fashion, which are distributed randomly along the polymer chain.

The amount of polyether blocks in these copolymers having polyamide blocks and polyether blocks is advantageously from 10 to 70% and preferably from 35% to 60% by weight of the copolymer.

The polyether diol blocks are either used as such and copolycondensed with carboxyl-terminated polyamide blocks or they are aminated in order to be converted into polyetherdiamines and condensed with carboxyl-terminated polyamide blocks. They may also be blended with polyamide precursors and a diacid chain stopper in order to make the polymers having polyamide blocks and polyether blocks having randomly distributed units.

The number-average molar mass $\overline{M}_n$ of the polyamide blocks is between 500 and 10000 and preferably between 500 and 4000 except for the polyamide blocks of the second type. The mass $\overline{M}_n$ of the polyether blocks is between 100 and 6000 and preferably between 200 and 3000.

These polymers having polyamide blocks and polyether blocks whether they derive from the copolycondensation of polyamide and polyether blocks that were prepared beforehand or from a one-step reaction have, for example, an intrinsic viscosity, measured in methacresol at 25° C. for an initial concentration of 0.8 g/100 ml, of between 0.8 and 2.5.

Mention may be made, for example, of the composition comprising, by weight:

a) from 1 to 99%, preferably 5 to 95%, of a first polyamide characterized by the following chain sequences:

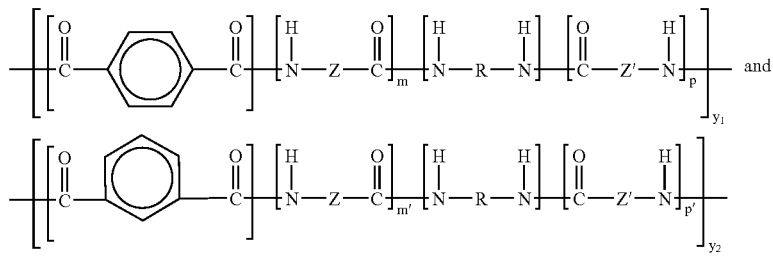

in which:

$y_1$ and $y_2$ are numbers such that their sum $y_1+y_2$ is between 10 and 200 and $y_1/y_1+y_2=0.5$;

m, p, m', p' are numbers equal to or greater than 0;

Z and Z' in the —NH—Z—CO— and —NH—Z'—CO aliphatic units, which are identical or different, are either a polymethylene segment $-\!(\!(CH_2)_{\overline{n}}$ where n is an integer equal to or greater than 6 and preferably between 7 and 11, or a sequence containing an amide functional group resulting from the approximately stoichiometric condensation of one or more aliphatic diamines containing at least 4 carbon atoms between the amine functional groups and of one or more aliphatic dicarboxylic acids containing at least 4, and preferably at least 6, carbon atoms between the acid functional groups; —HN—R—NH— is a cycloaliphatic and/or aliphatic and/or arylaliphatic diamine; it being possible for the aromatic diacid to be replaced by up to 30 mol % with an aliphatic dicarboxylic acid containing more than 4, preferably more than 6, carbon atoms between the acid functional groups; and b) 99 to 1%, preferably 95 to 5% of a semi-crystalline polyamide comprising at least 35%, preferably 50%, by weight of an aliphatic unit defined by the sequence —NH—$(CH_2)_{n'}$—CO— where n' is an integer equal to or greater than 6 and preferably between 7 and 11, optionally as part of a semiaromatic unit, and/or of an aliphatic unit defined by the sequence containing an amide functional group resulting from the approximately stoichiometric condensation or one or more aliphatic diamines containing at least 4 carbon atoms between the amine functional groups and of one or more aliphatic dicarboxylic acids containing at least 4, and preferably at least 6, carbon atoms between the acid functional groups, that can be obtained using a process that includes a step of blending the said first polyamide and the said semi-crystalline polyamide at a temperature above 300° C., preferably between 300 and 400° C. The semicrystalline polyamide is preferably chosen from the above mentioned aliphatic polyamides and is advantageously PA-11 or PA-12.

Advantageously, this composition comprises, by weight:

40 to 90% of the said first polyamide; and 60 to 10% of the said semicrystalline polyamide.

Preferably, the composition comprises, by weight:
50 to 80% of the said first polyamide; and
50 to 20% of the said semicrystalline polyamide.

Mention may also be made of the polyamide composition comprising a semicrystalline polyamide and a sufficient amount of amorphous polyamide having a glass transition temperature and having no phase change, in order to make it transparent and able to be processed hot without deformation, there can be obtained by blending its constituents at a temperature greater than or equal to 300° C. and by conversion at a temperature greater than or equal to 300° C., the transparency being such that the light transmission coefficient is greater than or equal to 50% measured at 700 nm and for a thickness of 2 mm.

Advantageously, this composition comprises, by weight:
65 to 80% of the said semicrystalline polyamide; and
35 to 20% of the said amorphous polyamide.

Preferably, this composition, comprise, by weight:
68 to 77% of the said semicrystalline polyamide; and
32 to 23% of the said amorphous polyamide.

The semicrystalline polyamide is preferably chosen from the above mentioned aliphatic polyamides and is advantageously PA-11 or PA-12.

Mention may also be made of the transparent composition, comprising by weight, the total being 100%:
  5 to 40% of an amorphous polyamide (B) that results essentially from the condensation:
    either of at least one diamine chosen from cycloaliphatic diamines and aliphatic diamines and of at least one diacid chosen from cycloaliphatic diacid and aliphatic diacid, at least one of these diamine or diacid units being cycloaliphatic,
    or of a cycloaliphatic α,ω-aminocarboxylic acid,
    or of a combination of these two possibilities and optionally, at least one monomer chosen from α,ω-aminocarboxylic acids or their possible corresponding lactams, aliphatic diacids and aliphatic diamines;
  0 to 40% of a flexible polyamide (C) chosen from copolymers having polyamide blocks and polyether blocks, and copolyamides;
  0 to 20% of a compatibliser (D) for (A) and (B);
  0 to 40% of a flexible modifier (M);
  with the condition that (C)+(D)+(M) is between 0 and 50%;
  the balance to 100% being a semicrystalline polyamide (A).

The semicrystalline polyamide is preferably chosen from the abovementioned aliphatic polyamides and is advantageously PA-11 or PA-12.

Mention may also be made of the transparent composition comprising, by weight, the total being 100%:
  5 to 40% of an amorphous polyamide (B) that results essentially from the condensation of at least one possibly cycloaliphatic diamine, of at least one aromatic diacid and optionally of at least one monomer chosen from:
    α,ω-aminocarboxylic acids,
    aliphatic diacids, and
    aliphatic diamines;
  0 to 40% of a flexible polyamide (C) chosen from copolymers having polyamide blocks and polyether blocks, and copolyamides;
  0 to 20% of a compatibliser (D) for (A) and (B);
  (C)+(D) is between 2 and 50%;
  with the condition that (B)+(C)+(D) is not less than 30%;
  the balance to 100% being a semicrystalline polyamide (A).

The semicrystalline polyamide is preferably chosen from the abovementioned aliphatic polyamides and is advantageously PA-11 or PA-12.

In these last two compositions, the terms "transparent", "polyamide", "semi-crystalline" and "amorphous" have the following definitions:

the term "transparent" corresponds to a light transmission coefficient of greater than or equal to 50%, measured at 560 nm and for a thickness of 2 mm, preferably it is greater than or equal to 80%;

the term "polyamide" employed in the present description also covers copolyamides, possibly containing third monomers in a proportion that does not impair the essential properties of the polyamides;

the term "semi-crystalline" covers (copolyamides) having both a glass transition temperature $T_g$ and a melting point $T_m$; and the term "amorphous" covers polyamides that pass into the liquid or molten state, therefore can be processed, above their $T_g$. These polymers do not have a priori a $T_m$ in DSC. However, they may have a $T_m$, but its intensity is then negligible and does not impair the essentially amorphous character of the polymer.

With regard to the TPU layer, these TPUs are formed from polyether soft blocks, which are polyetherdiol residues, and hard (polyurethane) blocks that result from the reaction of at least one diisocyanate with at least one short diol. The short chain extender diol may be chosen from the group formed from neopentyl glycol, cyclohexane dimethanol and aliphatic glycols of formula $HO(CH_2)_nOH$ in which n is an integer ranging from 2 to 10. The polyurethane blocks and the polyether blocks are linked by bonds resulting from the reaction of the isocyanate functional groups with the OH functional groups of the polyetherdiol.

Mention may also be made of polyester urethanes, for example those comprising diisocyanate functional units, units derived from amorphous polyesterdiols and units derived from a short chain extender diol. They may contain plasticisers.

The TPU may be a blend with copolymers having polyamide blocks and polyether blocks and/or vinylaromatic resins.

With regard to the vinylaromatic resin, the term "vinylaromatic monomer" is understood for the purpose of the present invention to mean an ethylenically unsaturated aromatic monomer such as styrene, vinyl toluene, α-methylstyrene, 4-methylstyrene, 3-methylstyrene, 4-methoxystyrene, 2-hydroxymethylstyrene, 4-ethylestyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene. The vinylaromatic resin is advantageously a styrene polymer.

As examples of styrene polymers, mention may be made of polystyrene, polystyrene modified by elastomers, styrene/acrylonitrile copolymers (SAN), SAN modified by elastomers, ABS, obtained for example by grafting (graft polymerization) of styrene and acrylonitrile onto a polybutadiene or butadiene-acrylonitrile copolymer backbone, SAN/ABS blends, ABS modified by elastomers, SAN modified by elastomers, and blends of SAN and ABS modified by elastomers. The abovementioned elastomers may, for example, be EPR (ethylene-propylene rubber or ethylene-propylene elastomer), EPDM (ethylene-propylene-diene rubber or ethylene-propylene-diene elastomer), polybutadiene, acrylonitrile-butadiene copolymer, polyisoprene and isoprene-acrylonitrile copolymer. These elastomers are used to improve the cold impact strength.

The impact polystyrene may be obtained either (i) by blending polystyrene with elastomers, such as polybutadiene, butadiene-acrylonitrile copolymers, polyisoprene or isoprene-acrylonitrile copolymers, or (ii) more usually by grafting styrene (graft polymerization) onto a polybutadiene or butadiene-acrylonitrile copolymer backbone.

In the styrene polymers that have just been mentioned, one part of the styrene may be replaced with unsaturated monomers that can be copolymerized with styrene, for example mention may be made of alpha-methyl styrene and (meth)acrylic esters. As examples of styrene copolymers, mention may also be made of polychlorostyrene, poly(α-methylstyrene), styrene-chlorostyrene copolymers, styrene-propylene copolymers, styrene-butadiene copolymers, styrene-isoprene copolymers, styrene-vinyl chloride copolymers, styrene-vinyl acetate copolymers, styrene-alkylacrylate (methyl, ethyl, butyl, octyl or phenyl acrylate) copolymers, styrene-alkylmethacrylate (methyl, ethyl, butyl, octyl or phenyl methacrylate) copolymers, styrene-methylchloroacrylate copolymers and styrene-acrylonitrile-alkyl acrylate copolymers. In these copolymers, the comonomer content will generally be up to 20% by weight.

The present invention also relates to metallocene polystyrenes having a high melting point. Advantageously, the vinylaromatic resin is ABS and SAN/ABS blends.

The proportion of TPU in the TPU layer may have any value provided that it is greater than 1%, and advantageously at least 20%, by weight.

According to one particular embodiment the polyamide layer is formed from two layers, an outer layer consisting of a polyamide chosen from semiaromatic or semicycloaliphatic PAs and aliphatic polyamides and, for example, either a layer of copolymers having polyamide blocks and polyether blocks, possibly containing a UV stabiliser, or a layer of a polyamide chosen from semiaromatic or semicycloaliphatic PAs and aliphatic polyamides, and possibly containing a UV stabiliser, that is to say the structure of the invention is a multilayer structure comprising, in succession, an outer layer consisting of a polyamide chosen from semiaromatic or semicycloaliphatic PAs and aliphatic polyamides, an intermediate layer which is either a layer of copolymers having polyamide blocks and polyether blocks possibly containing a UV stabiliser or a layer of a polyamide chosen from semiaromatic or semicycloaliphatic PAs and aliphatic polyamides and possibly containing a UV stabiliser, and a thermoplastic polyurethane (TPU) base layer.

EXAMPLES

TABLE 1

| | Upper layer | Lower layer | Intermediate layer | Transparency | Adhesion | Decoration | UV | Impact | Endurance | Cohesion |
|---|---|---|---|---|---|---|---|---|---|---|
| Counterexample 1 | PA12 | | | <50% | No | Yes | good | good | good | |
| Counterexample 2 | PA11-1 | | | >50% | No | Yes | good | good | very good | |
| Counterexample 3 | TPU-1 | | | >50% | Yes | No | poor | good | poor | |
| Counterexample 4 | TPU + ABS | | | >50% | Yes | No | poor | poor | poor | |
| Example 1 | PA11-1 | TPU-1 | | >50% | Yes | Yes | good | good | very good | good |
| Example 2 | PA11-1 | TPU-1 + 10% PEBA2 | | >50% | Yes | Yes | good | good | very good | very good |
| Example 3 | PA11-1 | TPU-1 + 50% PEBA2 | | >50% | Yes | Yes | | | | |
| Example 4 | PA11-1 | TPU-1 | PEBA2 | >50% | Yes | Yes | | | | |
| Example 5 | PA11-1 | TPU-1 | PEBA1 | >50% | Yes | Yes | | | | |
| Example 6 | PA11-1 | TPU-1 | TPU-2 | >50% | Yes | Yes | | | | |
| Example 7 | PA11-1 + 20% PEBA1 | TPU-1 | | >50% | Yes | Yes | | | | |
| Example 8 | PA11-2 | TPU-1 | | >50% | Yes | Yes | | | | |
| Example 9 | PA11-3 | TPU-1 | | >50% | Yes | Yes | | | | |
| Example 10 | PA12-1 | TPU-1 | | >50% | Yes | Yes | | | | |
| Example 11 | PA12-2 | TPU-1 | | >50% | Yes | Yes | | | | |
| Example 12 | PA11-4 | TPU-1 | | >50% | Yes | Yes | | | | |

TABLE 1-continued

| | | | | | | | |
|---|---|---|---|---|---|---|---|
| Example 3 | PA11-1 | TPU-1 + 50% PEBA2 | | good | good | very good | very good |
| Example 4 | PA11-1 | TPU-1 | PEBA2 | good | good | very good | very good |
| Example 5 | PA11-1 | TPU-1 | PEBA1 | good | good | very good | very good |
| Example 6 | PA11-1 | TPU-1 | TPU-2 | very good | good | very good | good |
| Example 7 | PA11-1 + 20% PEBA1 | TPU-1 | | good | good | very good | very good |
| Example 8 | PA11-2 | TPU-1 | | good | good | very good | very good |
| Example 9 | PA11-3 | TPU-1 | | good | good | very good | good |
| Example 10 | PA12-1 | TPU-1 | | good | good | very good | good |
| Example 11 | PA12-2 | TPU-1 | | good | good | very good | good |
| Example 12 | PA11-4 | TPU-1 | | good | good | very good | very good |

NB: The blends are preferably manufactured during a prior compounding step but may also be produced at the same time as the processing step.

References of the products and definitions

| | |
|---|---|
| Transparency = | light transmission at 560 nm for an object 2 mm in thickness. |
| Decoration = | capability of being decorated by sublimation. |
| UV = | Resistance to UV radiation. |
| Impact = | resistance to impact at low-temperature (0° C.–40° C.). |
| Endurance = | capability of withstanding external mechanical attack: abrasion by sand, blow by an object (for example a ski pole or ski edge). |
| Cohesion = | cohesion between the upper and lower layers. |
| PA-12 = | 45000 to 55000 Mw nylon-11. |
| PA11-1 = | 45000 to 55000 Mw nylon-11/35% PASA blend. |
| TPU-1 = | ether-based thermoplastic polyurethane of 85 Shore A hardness. |
| TPU-2 = | TPU-1 highly stabilised by UV stabilisers. |
| PA11-2 = | 45000 to 55000 Mw nylon-11/35% PAC2/20% PEBA1 blend. |
| PA11-3 = | 45000 to 55000 Mw nylon-11/35% PAC2 blend. |
| PA11-4 = | 45000 to 55000 Mw nylon-11/25% PAC2/6% AX8840 blend. |
| PA12-1 = | 45000 to 55000 Mw nylon-12/30% PAC1 blend. |
| PA12-1 = | 45000 to 55000 Mw nylon-12/30% PASA/20% PA11 blend. |
| PAC1 = | amorphous polyamide based on cycloaliphatic and aliphatic monomers, IPD.12/12 polyamide, composed of 75% IPDs.12 and 25% of 12 (lactam 12) by weight, IPD being isophorone diamine. |
| PAC2 = | amorphous polyamide based on cycloaliphatic and aliphatic monomers, IPD.10/12 polyamide, composed of 80% IPDs.10 and 20% of 12 (lactam 12) by weight, IPD being isophorone diamine. |
| PASA = | amorphous semiaromatic polyamide PA-12/BMACM, TA/BMACM, IA synthesised by melt polycondensation from bis-(3-methyl-4-aminocyclohexyl) methane (BMACM), lauryllactam (L12) and isophthalic and terephthalic acids (IA and TA) in a 1/1/0.3/0.7 molar ratio. |
| PEBA1 = | a copolymer having 5000 PA-12 blocks and 650 PTMG blocks and an MFI of 4 to 10 (g/10 min at 235° C./1 kg). |
| PEBA2 = | a copolymer having 1000 PA-12 blocks and 1000 PTMG blocks and an MFI of 4 to 10 (g/10 min at 235° C./1 kg). |
| AX8840 = | Lotada ®AX8840, an ethylene-glycidyl methacrylate copolymer having proportions of 92/8 by weight and an MFI at 190° C. at 2.16 kg of between 4 and 6, produced by Atofina. |

The invention claimed is:

1. A multilayer structure comprising a transparent polyamide-based layer and a layer based on a thermoplastic polyurethane (TPU), wherein the polyamide-based layer comprises at least one polyamide selected from the group consisting of semiaromatic or semicycloaliphatic polyamides and aliphatic polyamides, and wherein said TPU layer is selected from the group consisting of a TPU, a TPU layer is selected from the group consisting of a TPU, a TPU blend with copolymers having polyamide blocks, and a TPU blend with copolymers having polyether blocks.

2. The multilayer structure according to claim 1, in which the aliphatic polyamides are selected from the group consisting of PA-11, PA-12, aliphatic polyamides resulting from the condensation of an aliphatic diamine having from 6 to 12 carbon atoms and of an aliphatic diacid having from 9 to 12 carbon atoms, and 11/12 copolyamides having either more than 90% of 11 units or more than 90% of 12 units.

3. The multilayer structure according to claim 1, in which the polyamide layer further comprises copolymers having polyamide blocks and polyether blocks.

4. The multilayer structure according to claim 1, in which the vinylaromatic resin is an acrylonitrile/butadiene/styrene (ABS) or styrene/acrylonitrile (SAN) blend.

5. The multilayer structure of claim 4 wherein the vinylaromatic resin further is modified by elastomers.

6. The multilayer structure according to claim 1, in which the polyamide layer is formed from two layers, an outer layer consisting of a polyamide chosen from semiaromatic or semicycloaliphatic PAs and aliphatic polyamides and an inner layer selected from either a layer of copolymers having polyamide blocks and polyether blocks, optionally containing a UV stabiliser, or a layer of a polyamide chosen from semiaromatic or semicycloaliphatic PAs and aliphatic polyamides, and optionally containing a UV stabiliser.

7. An article comprising an object having bonded thereon the multilayer structure of claim 1, the polyamide layer being on the outside.

8. The article of claim 7, wherein said article is a decorated article.

9. The article according to claim 8, wherein said article is decorated by sublimation of inks into the polyamide layers.

10. The article of claim 7, wherein said object comprises a polyurethane foam or a polyurethane resin.

11. A process for forming a structure comprising a polyurethane foam or resin and the multilayer structure of claim 1 comprising either a) bonding the polyamide/TPU structure to a polyurethane foam or a polyurethane resin or b) overmoulding the polyurethane foam or the polyurethane resin to the polyamide/TPU structure placed in a mould, the polyamide layer being adjacent to the mould wall.

* * * * *

UNITED STATES PATENT AND TRADEMARK OFFICE
CERTIFICATE OF CORRECTION

| | | |
|---|---|---|
| PATENT NO. | : 7,097,908 B2 | Page 1 of 1 |
| APPLICATION NO. | : 10/967587 | |
| DATED | : August 29, 2006 | |
| INVENTOR(S) | : Christophe Lacroix and Thibaut Montanari | |

It is certified that error appears in the above-identified patent and that said Letters Patent is hereby corrected as shown below:

In the claims:

1. A multilayer structure comprising a transparent polyamide-based layer and a layer based on a thermoplastic polyurethane (TPU), wherein the polyamide-based layer comprises at least one polyamide selected from the group consisting of semiaromatic or semicycloaliphatic polyamides and aliphatic polyamides, and wherein said TPU layer is selected from the group consisting of a TPU, a TPU blend with copolymers having polyamide blocks, and a TPU blend with copolymers having polyether blocks.

Signed and Sealed this

Twelfth Day of December, 2006

JON W. DUDAS
*Director of the United States Patent and Trademark Office*